US009329592B2

(12) United States Patent
Thomasset-Laperriere et al.

(10) Patent No.: US 9,329,592 B2
(45) Date of Patent: May 3, 2016

(54) METHODS AND SYSTEMS FOR CALCULATION OF FEEDRATE

(71) Applicant: Pratt & Whitney Canada Corp., Longueuil (CA)

(72) Inventors: Vincent Thomasset-Laperriere, Montreal (CA); Amr Elfizy, Longueuil (CA)

(73) Assignee: PRATT & WHITNEY CANADA CORP., Longueuil, CA (US)

( * ) Notice: Subject to any disclaimer, the term of this patent is extended or adjusted under 35 U.S.C. 154(b) by 664 days.

(21) Appl. No.: 13/686,193

(22) Filed: Nov. 27, 2012

(65) Prior Publication Data
US 2014/0148942 A1    May 29, 2014

(51) Int. Cl.
*G05B 19/19*        (2006.01)
*G05B 19/416*       (2006.01)

(52) U.S. Cl.
CPC .. *G05B 19/4166* (2013.01); *G05B 2219/43156* (2013.01)

(58) Field of Classification Search
CPC ....................................................... G05B 19/19
USPC ................................................. 700/186–188
See application file for complete search history.

(56) References Cited

U.S. PATENT DOCUMENTS

| 3,970,830 | A | | 7/1976 | White et al. |
| 4,596,501 | A | | 6/1986 | Wu |
| 4,757,457 | A | * | 7/1988 | Matsumoto .................... 700/188 |
| 5,083,280 | A | * | 1/1992 | Yamamoto et al. ........... 700/188 |
| 5,493,502 | A | | 2/1996 | Niwa |
| 5,828,574 | A | * | 10/1998 | Robinson et al. ............. 700/173 |
| 6,112,133 | A | | 8/2000 | Fishman |
| 6,587,747 | B2 | | 7/2003 | Hirai et al. |
| 6,632,053 | B2 | * | 10/2003 | Koch ............................ 409/132 |
| 6,999,845 | B2 | | 2/2006 | Hirai et al. |
| 2011/0166693 | A1 | * | 7/2011 | Nishibashi .................... 700/187 |

* cited by examiner

*Primary Examiner* — Kenneth M Lo
*Assistant Examiner* — Derrick Boateng
(74) *Attorney, Agent, or Firm* — Norton Rose Fulbright Canada LLP (57) ABSTRACT

Methods and systems for calculating a feedrate for programming a multi-axis machining tool. For at least one control block in a defined machining path: a displacement of a defined machine control point from a previous control block to a current control block is determined; a displacement of a defined feedrate control point from the previous control block to the current control block is determined; a compensation ratio is calculated as a ratio between the displacement of the defined machine control point and the displacement of the defined feedrate control point; and a feedrate for the machine control point is calculated by applying the compensation ratio to a desired feedrate. The calculated federate is used in a control block of a multi-axis machining tool.

18 Claims, 11 Drawing Sheets

METHODS AND SYSTEMS FOR CALCULATION OF FEEDRATE

TECHNICAL FIELD

The disclosure relates generally to methods and systems for calculating a feedrate, for example for use in controlling a multi-axis machining tool.

BACKGROUND OF THE ART

In machining, feedrate refers to the velocity at which the cutter tool is fed, that is, advanced against the workpiece. It may be desirable to set the tool at a certain feedrate, in order to achieve a desired machining result (e.g., to avoid damaging the workpiece). In order to control the feedrate, an approximation of the expected feedrate is typically calculated on a simulation of the machining. An accurate calculation of the feedrate may be crucial in high performance machining, for example in order to achieve a desired machined surface quality as well as to improve tool life and ultimately process economics.

Current methods of calculating the feedrate are approximations based on the tool center point displacement, tool tip displacement or spindle face center point. However, those methods typically are not sufficiently accurate to represent the relative speed between the tool and the workpiece.

The impact of inaccurate feedrate calculation typically varies between 5-axis point and flank machining styles.

Figure 1:
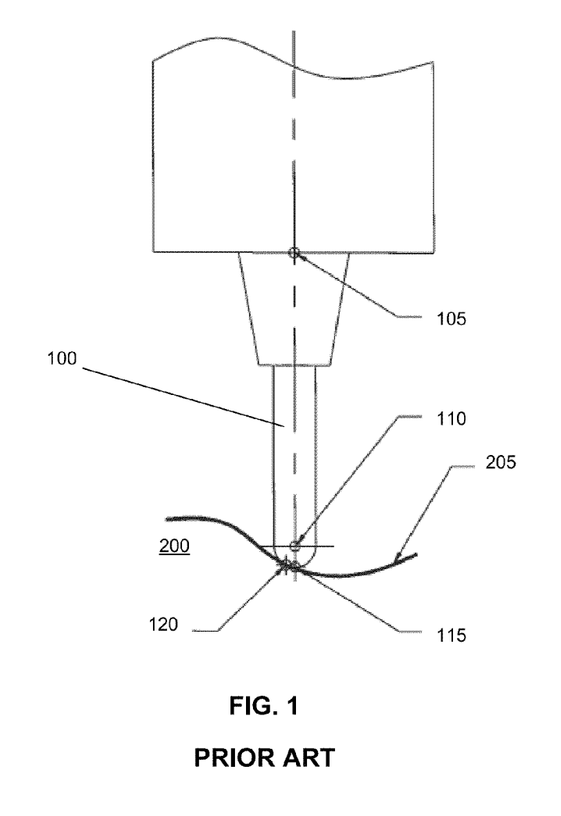
FIG. 1 illustrates points used in the prior art for feedrate calculation for 5-axis point machining.

FIG. 1 shows an example of 5-axis point machining style. In this example, the machining tool 100 is in contact with the machined surface 205 of the workpiece 200 at a contact point. The example figure defines the various points, namely the spindle center point (SCP) 105, the tool center point (TCP) 110 and the tool tip point (TTP) 115 which may be used to control the tool 100 and which may be basis of the calculated feedrate for programming the tool 100 (which may also be referred to as the programmed feedrate). Notably, the actual tool-workpiece contact point (TWCP) 120 may be different from each of SCP 105, TCP 110 and TTP 115, as the tool 100 travels over the machined surface 205 of the workpiece 200. The actual location of the contact point on the tool 100 typically varies depending on tool orientation, workpiece geometry and/or the relative location between the tool 100 and workpiece 200.

When feedrate cannot be calculated with sufficient accuracy, the operator typically must manually adjust the feedrate command values in the numerical control (NC) program before running the program, by relying on the operator's own experience, judgment and skills. This may require significantly slowing down the machining process, may require repeated trial-and-error, may be highly operator-dependent and/or may be a source of error.

SUMMARY

The present disclosure describes methods and systems for calculation of feedrate, particularly for control of machining tools in multi-axis (e.g., 5-axis) machining.

In various aspects and example embodiments, the disclosure provides a method for calculating a feedrate for programming a multi-axis machining tool, the method may include: for at least one control block in a defined machining path: determining a displacement of a defined machine control point from a previous control block to a current control block; determining a displacement of a defined feedrate control point from the previous control block to the current control block; calculating a compensation ratio as a ratio between the displacement of the defined machine control point and the displacement of the defined feedrate control point; and calculating a feedrate for the machine control point, by applying the compensation ratio to a desired feedrate; and using the calculated feedrate in a control block of a multi-axis machining tool.

In various aspects and example embodiments, the disclosure provides a system for calculating a feedrate for programming a multi-axis machining tool, the system comprising a processor configured to execute computer-readable instructions for causing the system to: for at least one control block in a defined machining path: determine a displacement of a defined machine control point from a previous control block to a current control block; determine a displacement of a defined feedrate control point from the previous control block to the current control block; calculate a compensation ratio as a ratio between the displacement of the defined machine control point and the displacement of the defined feedrate control point; and calculate a feedrate for the machine control point, by applying the compensation ratio to a desired feedrate; and use the calculated feedrate in a control block of a multi-axis machining tool.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Aspects of various embodiments are described through reference to the drawings.

In various example aspects and embodiments, the present disclosure provides methods and systems for calculating the commanded feedrate in various multi-axis machining styles, including 5-axis point machining and 5-axis flank machining styles, for example. The present disclosure may make use of computer-aided manufacturing (CAM) software to determine the contact point or contact line at each machining position increment. The present disclosure may result in relatively accurate determination of the contact speed.

Figure 3:
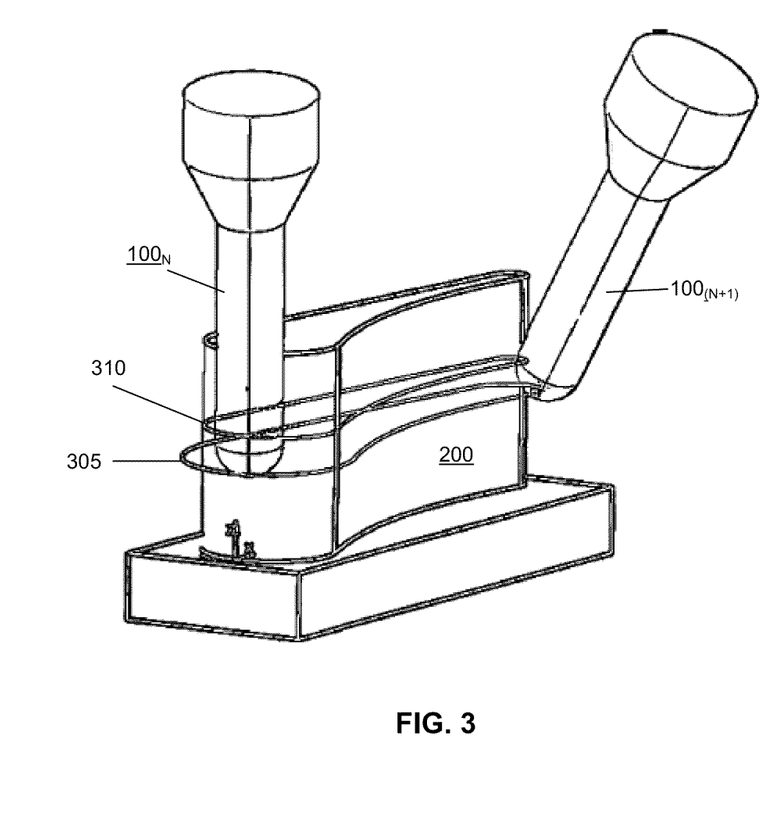
FIG. 3 shows example traces of paths traveled by a tool tip and the actual contact point in a machining process.

Consider the example of a 5-axis point machining style, where the contact between the machining tool and the workpiece is at one point. FIG. 3 shows example traces of the TTP path 305 and the TWCP path 310 as the surface of the workpiece 200 is being machined by the tool 100. Throughout this disclosure and in the drawings, the subscripts N and N+1 may be used to indicate the position of the tool and points of interest at NC blocks N and N+1, respectively. Since the tool vector may change significantly during machining (e.g., at points of high curvature on the workpiece 200), simply using the TTP 115, SCP 105 or TCP 110 to approximate the actual contact between the tool 100 and the workpiece 200 and to control the feedrate may not be sufficient to calculate a feedrate sufficiently close to the actual feedrate value.

Figure 2:
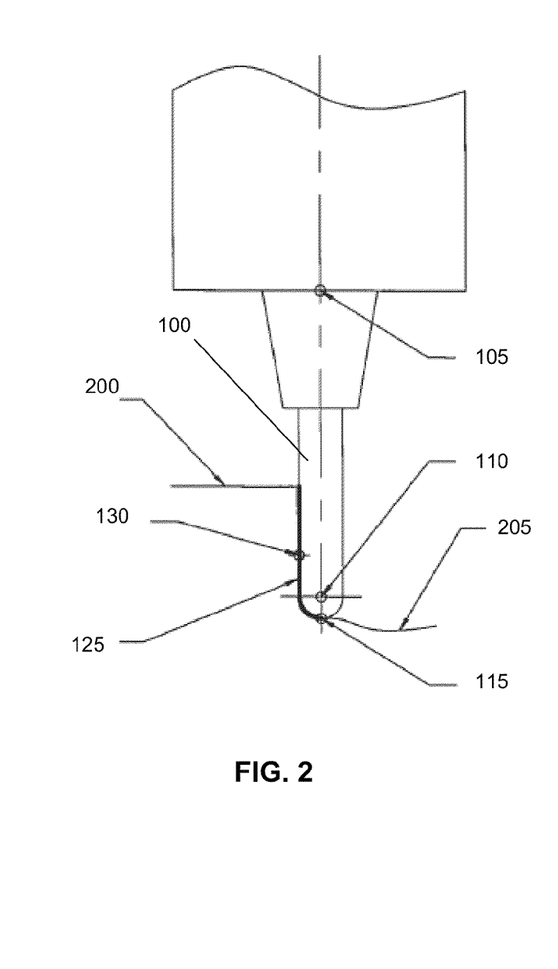
FIG. 2 illustrates points used for feedrate calculation for 5-axis flank machining.

FIG. 2 shows an example of 5-axis flank machining style. In this style of machining, the contact between the workpiece 200 and tool 100 can be approximated as a contact line 125, rather than a contact point. The contact line 125 may be characterized by a contact line center point (CLCP) 130, may not coincide with any of SCP 105, TCP 110 or TTP 115. None of the conventional methods of calculating feedrate using SCP 105, TCP 110 or TTP 115 have been found to be sufficiently accurate to represent the actual machining feedrate.

Figure 4:
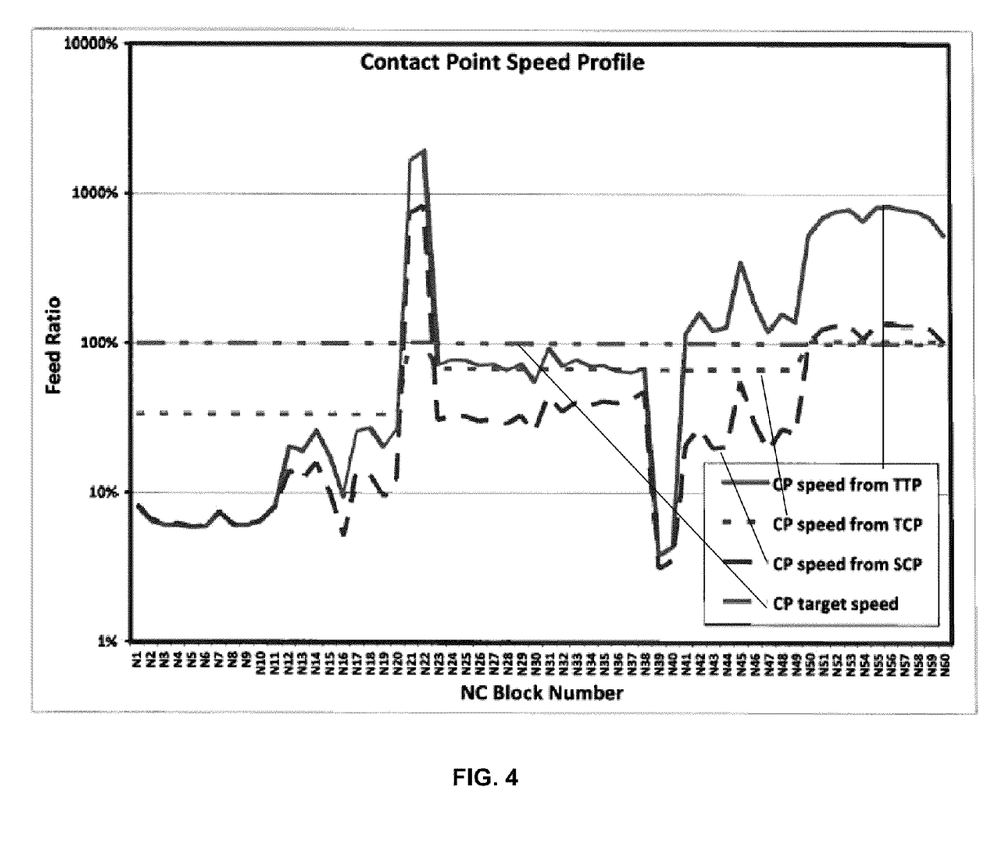
FIG. 4 is a chart comparing the contact point speed profiles achieved by using prior art approximations for calculating feedrate.

FIG. 4 shows an example of contact point speeds achieved using each of the three conventional feedrate control points (i.e., SCP 105, TCP 110 and TTP 115), and the target speed of the actual contact point. If the programmed feedrate is calculated based on any of the SCP 105, TCP 110 or TTP 115 control point displacements, the actual contact point speed may vary significantly, as shown in FIG. 4. This error may be particularly significant where the tool 100 is required to tilt away from the vertical axis. These conventional methods may not be sufficient to maintain the desired contact point machining speed along the full numerical control (NC) tool path.

Figure 5:
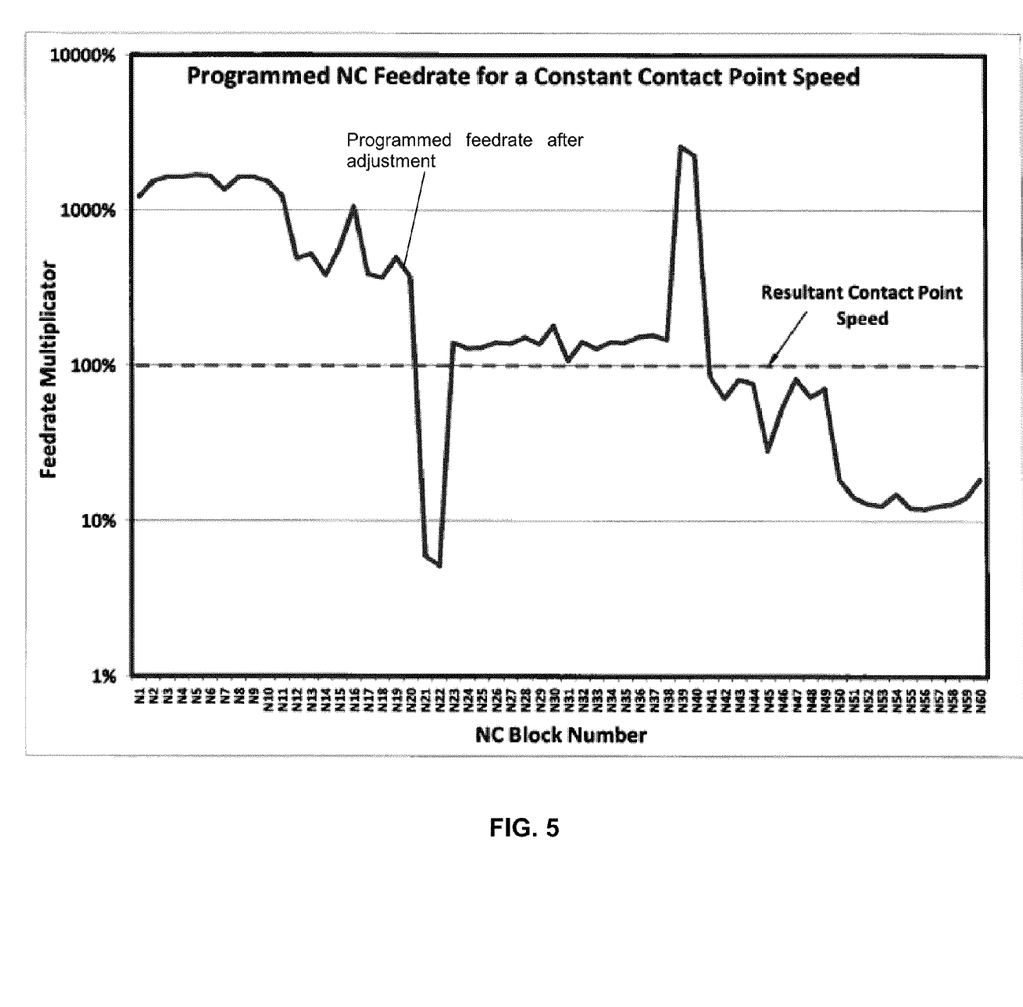
FIG. 5 is a chart showing the programmed feedrate required for constant contact point speed in an example of point machining.

In the present disclosure, in order to achieve a constant or near-constant contact point speed, the programmed NC feedrate may need to be corrected and/or adjusted at each NC block along the defined machining path, for example as shown in FIG. 5. Correction and/or adjustment may be through applying a compensation ratio to the originally determined programmed feedrate that was calculated using the defined machine control point (e.g., at the TTP 115, TCP 110 or SCP 105).

The compensation ratio may be calculated for each NC block based on the ratio between the displacement of the machine control point (e.g., at the TTP 115, TCP 110 or SCP 105, which may be selected by the user) and the displacement of the actual point at which feedrate should be controlled (typically the actual point of contact between the tool 100 and the machined surface 205). The machine control point displacement to feedrate control point displacement ratio may be thus referred to as the compensation ratio.

In point machining, the feedrate control point may be defined to be the actual TWCP 120. Suitable CAM software (e.g., any suitable off-the-shelf CAM software) may be used to obtain a sufficiently accurate calculation of the TWCP 120 between the tool 100 and the machined surface 205 at each NC block. The location of the TWCP 120 may then be used as the feedrate control point, to calculate the compensation ratio as a ratio between the machine control point displacement and the feedrate control point displacement.

The NC programmed feedrate may then be calculated as in equation (1) below:

$$\text{Programmed feedrate} = \frac{\text{Machine control point displacement}}{\text{Feedrate control point displacement}} \times \text{Desired feedrate} \quad (1)$$

where displacement is determined as the displacement of the machine control point or the feedrate control point from a previous NC control block (e.g., block number N) to the current NC control block (e.g., block number N+1). The desired feedrate may be predefined (e.g., by user selection).

The tool 100 may then be controlled at the TTP 115, TCP 110 or SCP 105 using the calculated programmed feedrate.

In the case of 5-axis flank machining style, there may be no clear TWCP 120 that may be used to represent the point for calculated actual contact speed between the tool 100 and the workpiece surface 205, since contact between the tool 100 and the machined surface 205 may not be at a point, but may be rather a line. The present disclosure provides different methods to approximate the NC programmed feedrate control point in order to reduce the impact of any significant contact speed change along the tool 100 and machined surface 205 interface.

Figure 6:
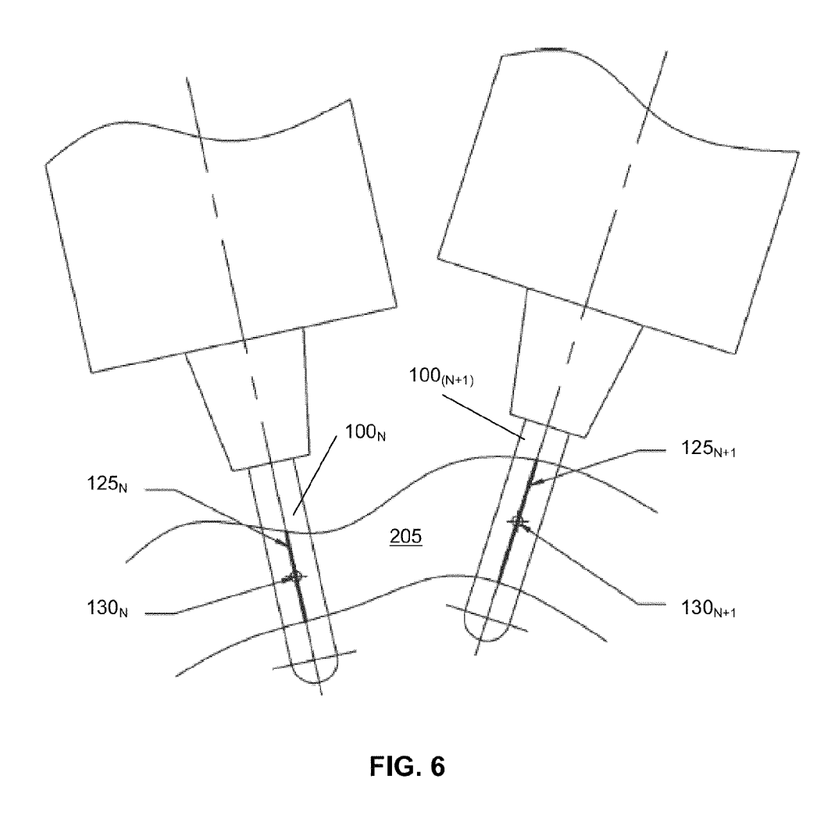
FIG. 6 illustrates an example method for calculating the feedrate in flank machining, using the contact line center point as the feedrate control point.

One example uses the contact line center point (CLCP) 130 for approximation of the feedrate control point for the contact line. In this example, illustrated by FIG. 6, the contact between the machining tool 100 and the machined surface 205 defines a contact line 125. The zero point or bottom of the contact line 125 may be defined as the end of the contact line 125 closer to the tool tip 115. The mid-point or center point 130 of the contact line may be calculated, for example using appropriate CAM software (e.g., using a simulation of the machining process). In this example, calculation of the contact line 125 and the CLCP 130 may be carried out for each NC control block. In the example shown, the contact line 125 and the CLCP 130 have been determined for NC blocks N and N+1, as denoted by the subscripts. The feedrate control point may be defined as the CLCP 130, and the compensation ratio may be calculated accordingly.

Figure 7:
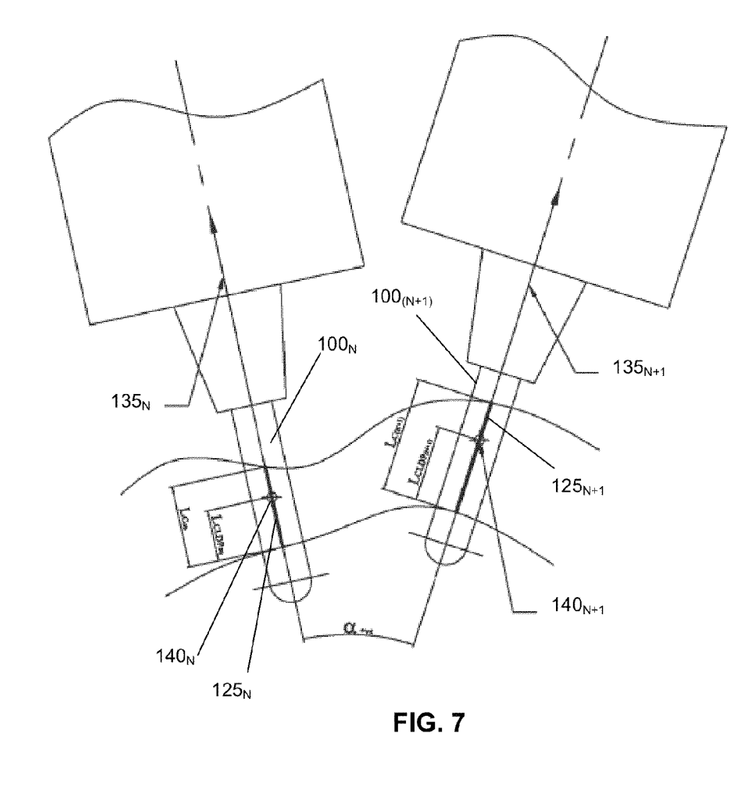
FIG. 7 illustrates an example method for calculating the feedrate in flank machining, using the contact line driving point as the feedrate control point.

Another example uses the contact line driving point (CLDP) for approximation of the feedrate control point. An example is illustrated in FIG. 7. The driving point may be a point on the contact line 125 that is defined using a weight factor based on angular displacement of the tool 100, as determined using the tool vector 135. The tool vector 135 may be defined to be a vector starting from the tool tip 115 along the longitudinal axis of the tool 100. The tool vector 135 may be determined (e.g., using appropriate CAM software) for each NC control block (in the example shown, for NC blocks N and N+1). The amount and direction of vector rotation of the tool vector 135 may be used to determine the location of the CLDP 140. The relative location of the CLDP 140 may be calculated using equation (2) below:

$$L_{CLDP(N+1)} = \left(\frac{\alpha°}{180°} + 0.5\right) L_{C(N+1)} \quad (2)$$

Where $L_{CLDP(N+1)}$ is the CLDP 140 position for NC block N+1, $L_{CN+1}$ is the length of the contact line 125 at NC block N+1, and $\alpha$ indicates the amount and direction of vector rotation of the tool vector 135 from NC block N to NC block N+1. As indicated by equation (2), the greater the vector rotation experienced by the tool from NC block N to NC block N+1, the higher (i.e., farther away from the tool tip 115) the CLDP 140. This calculation may be suitable to accommodate the fact that the part of the tool 100 farther away from the tool tip 115 travels a greater distance than the tool tip 115, when the tool experiences vector rotation. The feedrate control point may be defined as the CLDP 140, and the compensation ratio may be calculated accordingly.

Figure 8:
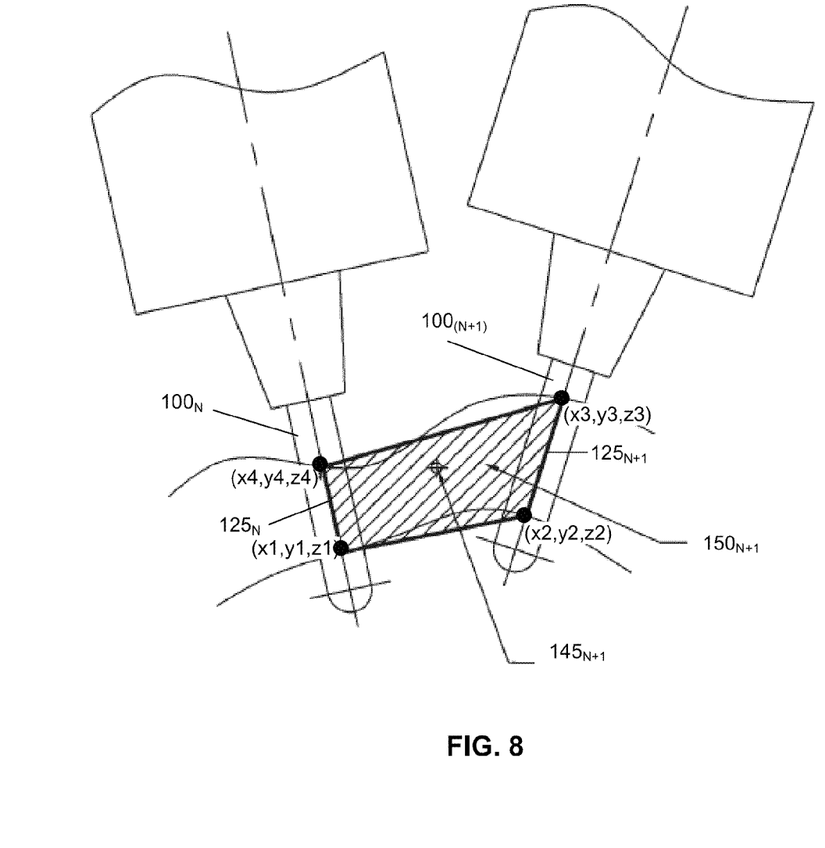
FIG. 8 illustrates an example method for calculating the feedrate in flank machining, using the swept contact surface centroid as the feedrate control point.

Another example, illustrated in FIG. 8, uses a swept contact surface centroid (SCSC) 145 for approximation of the feedrate control point. The SCSC 145 may be calculated using the coordinates (x1, y1, z1) and (x4, y4, z4) defining start and end of a first contact line 125 (e.g., contact line 125 at NC block N) and coordinates (x2, y2, z2) and (x3, y3, z3) defining start and end of a second contact line 125 (e.g., contact line 125 at NC block N+1) to construct a swept contact surface 150 (which may or may not be planar) traveled by the tool (e.g., using appropriate CAM software). The centroid 145 of the swept contact surface 150 may then be determined (e.g., using appropriate CAM software). The location of the centroid 145 may then be used as the feedrate control point, and the compensation ratio may be calculated accordingly.

Once the feedrate control point is determined, for example using any of the above methods, the NC programmed feedrate may be calculated using equation (1), described above.

Figure 10:
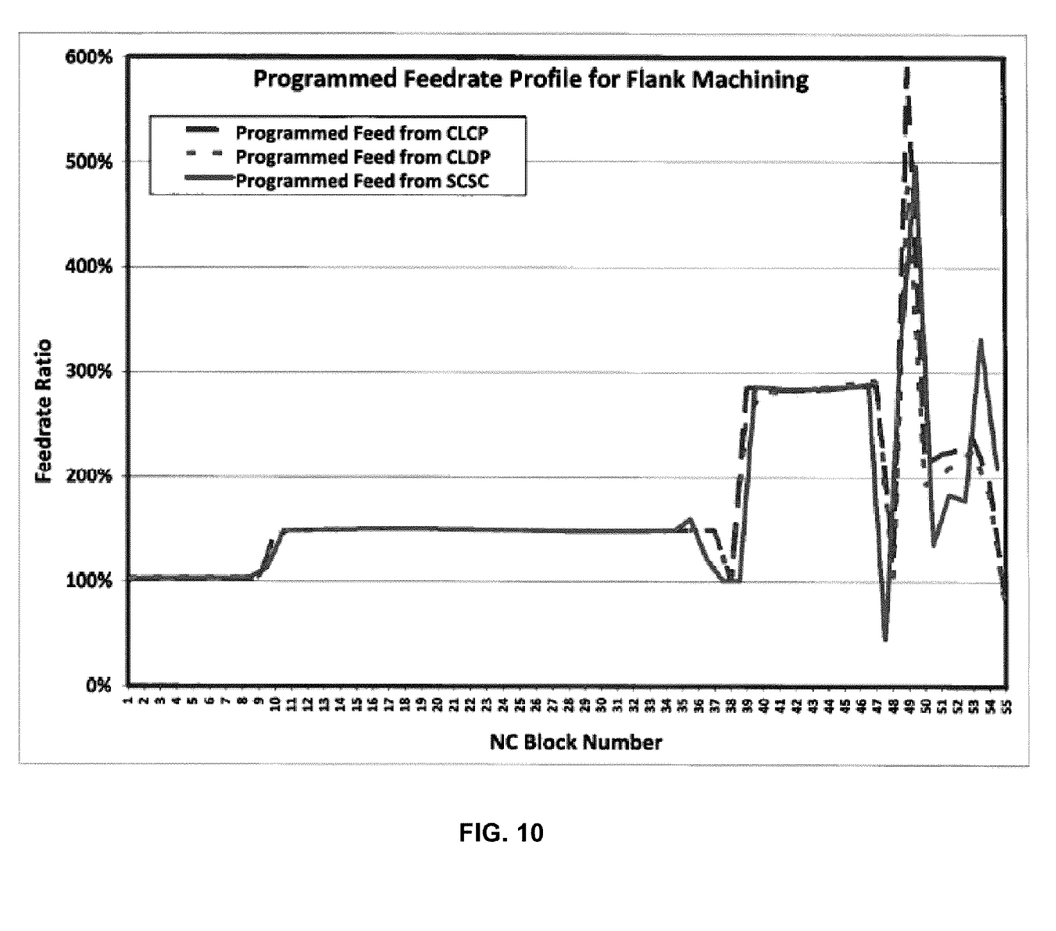
FIG. 10 is a chart comparing example feedrate profiles calculated using each of the methods illustrated in FIGS. 6 to 8.

FIG. 10 shows an example comparison between the feedrates calculated using different example feedrate control points approximation methods (e.g., using the CLCP 130, the CLDP 140 or the SCSC 145) for flank machining, as described above. In order to achieve the programmed speed at the feedrate control point, the NC programmed feedrate may need to be adjusted accordingly for each NC block, for example by applying the calculated compensation ratio.

As illustrated by this comparison, using the SCSC 145 as the feedrate control point may result in greater and/or more abrupt changes in the compensation ratio along the machining path. Using the SCSC 145 as the feedrate control point may result in a programmed feedrate that provides an actual feedrate that is closer to the desired feedrate, compared to using the CLCP 130 or the CLDP 140 as the feedrate control point. Using the CLCP 130 or the CLDP 140 as the feedrate control point may result in simpler and/or quicker calculation of the programmed feedrate. However, the processor used for calculating the programmed feedrate may have sufficient memory and/or processing power such that there may be little or no difference in calculation speed using the different approximation methods described above.

Using CLCP 130 as the feedrate control point may be the least burdensome computationally. Using the CLDP 140 as the feedrate control point may help to dampen unwanted jerking and/or machine speed spikes, compared to using the CLCP 130 as the feedrate control point.

In some examples, the feedrate control point may be defined differently along different portions of the machining path. For example, in portion(s) of the machining path where there greater deviation from the desired feedrate is expected (e.g., at portion(s) of greater angular velocity/acceleration), the feedrate control point may be defined using the SCSC 145, while in other portion(s) of the machining path, the feedrate control point may be defined using the CLCP 130 or the CLDP 140. In some examples, the programmed feedrate may be calculated first using CLCP 130 as the feedrate control point, then using CLDP 140 as the feedrate control point for any portions of concern (e.g., any portions of the machining path having greater angular velocity/acceleration), and optionally the SCSC 145 may be used as the feedrate control point to verify or validate the programmed feedrate.

This may be done in order to reduce use of processing and/or memory resources of a processor.

Figure 11:
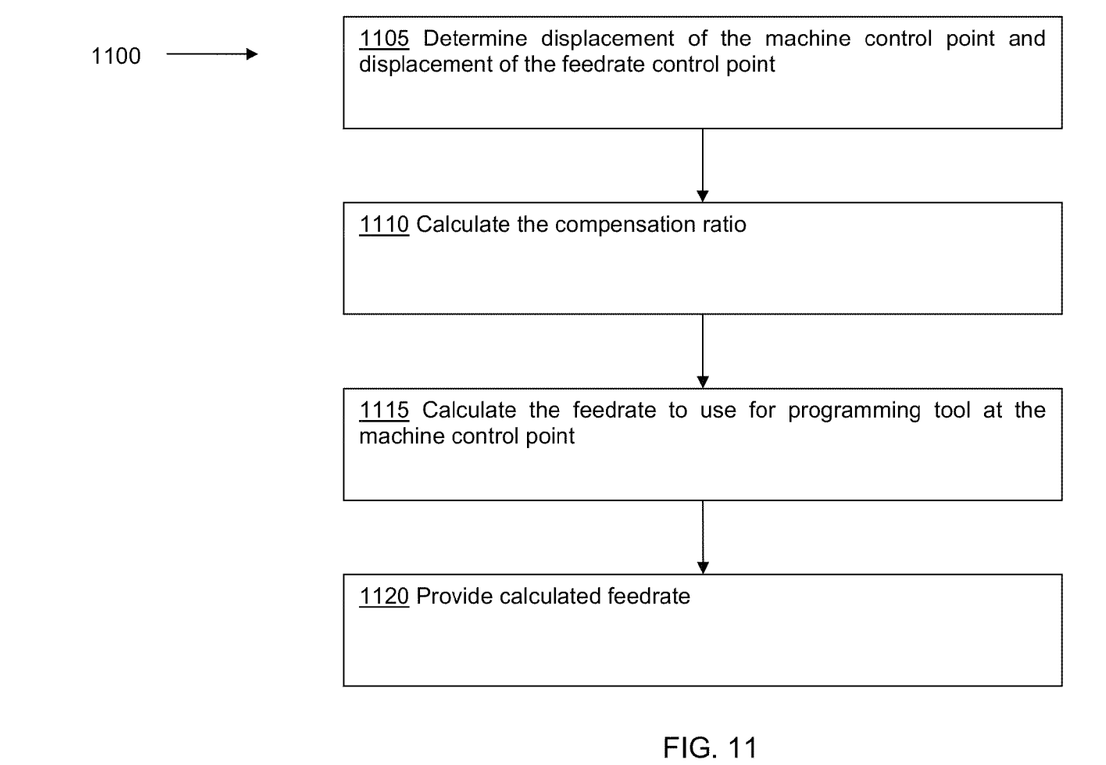
FIG. 11 is a flowchart illustrating an example method for calculation of the feedrate.

FIG. 11 illustrates an example method for calculating the feedrate to use for programming a machining tool, for example a multi-axis machining tool (e.g., used in 5-axis point or flank machining).

At 1105, the displacement of a machine control point and the displacement of a defined feedrate control point are determined, for example using suitable CAM software. This may be determined for each NC block in the computer-controlled machining path.

Any suitable machine control point (e.g., TTP, TCP or SCP) may be defined, for example by the user. The feedrate control point may be defined using any of the example techniques described above, for example according to the user's preference. For example, in point machining, the feedrate control point may be defined as the TWCP, which may be determined for each NC block using suitable CAM software. In flank machining, the feedrate control point may be defined as the CLCP, CLDP and/or SCSC (according to predefined settings and/or the user's selection) and may be determined for each NC block by the CAM software (e.g., according to the techniques described above).

At 1110, the ratio of the selected machine control point displacement to the actual contact point displacement is calculated. This ratio may be defined as the compensation ratio. This may be calculated for each NC block.

At 1115, the feedrate to be used for programming the machining tool at each NC block is calculated by applying the calculated compensation ratio to the desired feedrate for each NC block. The desired feedrate may be defined by the user. Typically, the desired feedrate may be a constant value throughout the machining process, although in some examples the desired feedrate may vary throughout the machining process.

At 1120, the total of the calculated feedrate for all NC blocks may be provided, to be used for programming the machining tool, for example. For example, the calculated feedrate may be communicated to an appropriate NC system. Alternatively or additionally, the calculated feedrate may be stored and/or transmitted to another system (e.g., for future use).

Although steps 1105, 1110 and 1115 have been described as being carried out for each NC block, in some examples it may not be necessary to carry out each of these steps for each NC block. For example, such calculations may be carried out for every other NC block (e.g., where less precise control of feedrate is required) or otherwise skipping calculations for certain NC blocks (e.g., at portion(s) of the machining path where less deviation from the desired feedrate is expected, such as at relatively straight portions of the machining path). In some examples, one or more of steps 1105, 1110 and 1115 may be carried out for all NC blocks of interest before moving to the next step.

The disclosed methods for calculation of the feedrate may not be possible using conventional systems, which typically are not capable of calculations involving CAM software. For example, conventional systems may rely on hardware (e.g., manual adjustments by an operator) to compensate for feedrate deviations. Manually adjusting the feedrate by an operator may require more trial-and-error, may be more dependent on the operator's experience and/or may be more time-consuming, compared to the presently disclosed methods.

The present disclosure may be useful for the machining of airfoil for aerospace applications, where feedrate variations may affect part quality. The conventional methods typically use an unsystematic approach of approximation (e.g., including manual changes), which may yield inaccurate feedrate values and limit process speed. Such conventional methods may not achieve the accuracy desired, especially for machining airfoils.

The present disclosure also provides different approximation methods, which may be selected based on the geometry to be machined.

Although feedrate calculate for point machining and for flank machining have been separately described, in some examples the machining style may be a mix of point and flank machining. Calculation of the feedrate may include defining the feedrate control point using different methods along the machining path. For example, in portion(s) of the machining path where the tool and machined surface are in contact at a contact point, the feedrate control point may be defined using the TWCP 120; while at other portion(s) of the machining path where the tool and machined surface are in contact at a contact line, the feedrate control point may be defined using the CLCP 130, CLDP 140 and/or SCSC 145.

The present disclosure may be implemented using any suitable computing system including, for example, one or more processors, one or more desktop devices, one or more laptop devices, one or more handheld devices, one or more servers, and combinations thereof. The system may include one or more input devices (e.g., keyboard and mouse) and one or more output devices (e.g., display). The system may also be capable of transmitting and/or receiving signals from one or more other systems.

Figure 9:
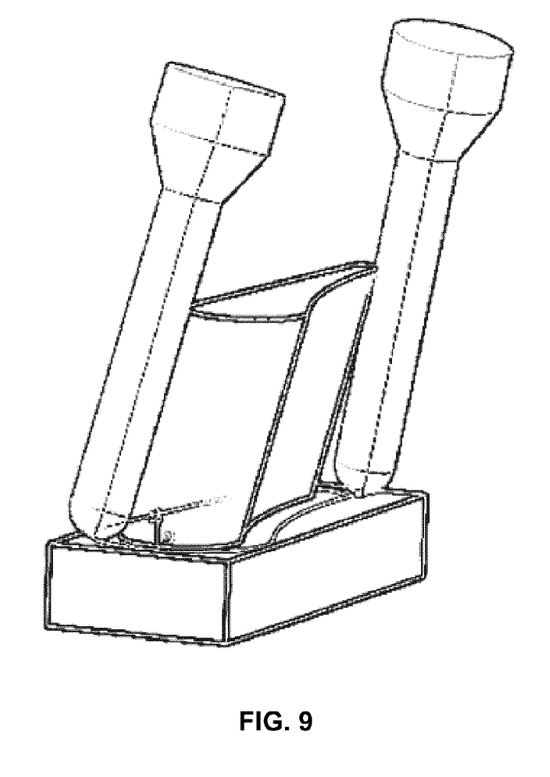
FIG. 9 illustrates an example of flank machining of an airfoil.

The present disclosure may be useful in any suitable machining application, such as any application where it may be desirable to have better inverse timing feed control. The present disclosure may be useful in machining of moulds, turbines or airfoils (e.g., as shown in FIG. 9), for example.

Although the description refers to 5-axis machining, the present disclosure may be suitable for other types of machining, including point-milling for 3-dimensional milling, super abrasive machining, grinding, deburring, sand blasting, shot peening and plasma spray, for example.

The above description is meant to be exemplary only, and one skilled in the art will recognize that changes may be made to the embodiments described without departing from the scope of the invention disclosed. The present disclosure may be implemented as computer-readable instructions, which may be tangibly embedded in a memory (e.g., RAM, flash drive, EEPROM or other internal or external memory of a processor) or a computer program product (e.g., DVD, CD or any other storage product).

Still other modifications which fall within the scope of the present invention will be apparent to those skilled in the art, in light of a review of this disclosure, and such modifications are intended to fall within the appended claims.

The invention claimed is:

1. A method for calculating a compensated feedrate based on a feedrate control point from a desired feedrate calculated based on a machine control point for programming a multi-axis machining tool, the method comprising:
   for at least one control block in a defined machining path:
      determining a displacement of the machine control point from a previous control block to a current control block;
      determining a displacement of the feedrate control point from the previous control block to the current control block, the feedrate control point comprising a contact point between the tool and a workpiece;
      calculating a compensation ratio as a ratio between the displacement of the machine control point and the displacement of the feedrate control point; and
      calculating the compensated feedrate for the machine control point by applying the compensation ratio to the desired feedrate; and
   using the calculated compensated feedrate in the at least one control block of the multi-axis machining tool.

2. The method of claim 1 wherein the feedrate control point is defined as mid-point of a contact line between the tool and the workpiece.

3. The method of claim 1 wherein the feedrate control point is defined as a weighted point on a contact line between the tool and the workpiece, wherein weighing of the weighting point is based on angular displacement from the previous control block to the current control block.

4. The method of claim 1 wherein the feedrate control point is defined as a centroid of a swept surface travelled by the tool between the previous control block to the current control block.

5. The method of claim 1 wherein the feedrate control point is determined using one or more computer-aided manufacturing (CAM) methods.

6. The method of claim 1 wherein the previous control block is a control block immediately preceding the current control block.

7. The method of claim 1 wherein the multi-axis machining tool is a 5-axis machining tool.

8. The method of claim 1 wherein the multi-axis machining tool is used for at least one of: 3-dimensional milling, super abrasive machining, grinding, deburring, sand blasting, shot peening and plasma spraying.

9. The method of claim 1 wherein the at least one control block is every control block in the defined machining path.

10. A system for calculating a compensated feedrate based on a feedrate control point from a desired feedrate calculated based on a machine control point for programming a multi-axis machining tool, the system comprising a processor configured to execute computer-readable instructions for causing the system to:
   for at least one control block in a defined machining path:
      determine a displacement of the machine control point from a previous control block to a current control block;
      determine a displacement of the feedrate control point from the previous control block to the current control block, the feedrate control point comprising a contact point between the tool and a workpiece;
      calculate a compensation ratio as a ratio between the displacement of the machine control point and the displacement of the feedrate control point; and
      calculate the compensated feedrate for the machine control point by applying the compensation ratio to the desired feedrate; and
   use the calculated compensated feedrate in the at least one control block of the multi-axis machining tool.

11. The system of claim 10 wherein the feedrate control point is defined as a mid-point of a contact line between the tool and the workpiece.

12. The system of claim 10 wherein the feedrate control point is defined as a weighted point on a contact line between the tool and the workpiece, wherein weighing of the weighting point is based on angular displacement from the previous control block to the current control block.

13. The system of claim 10 wherein the feedrate control point is defined as a centroid of a swept surface traveled by the tool between the previous control block to the current control block.

14. The system of claim 10 wherein the feedrate control point is determined using one or more computer-aided manufacturing (CAM) methods.

15. The system of claim 10 wherein the previous control block is a control block immediately preceding the current control block.

16. The system of claim 10 wherein the multi-axis machining tool is a 5-axis machining tool.

17. The system of claim 10 wherein the multi-axis machining tool is used for at least one of: 3-dimensional milling, super abrasive machining, grinding, deburring, sand blasting, shot peening and plasma spraying.

18. The system of claim 10 wherein the at least one control block is every control block in the defined machining path.

* * * * *